United States Patent [19]

Todaka et al.

[11] Patent Number: 4,835,617
[45] Date of Patent: May 30, 1989

[54] IMAGE PICKUP DEVICE FOR TELEVISION CAMERAS HAVING A SHUTTER FUNCTION FOR A PHOTODIODE MATRIX OPERATED USING MOS SWITCHES

[75] Inventors: Yoshihiro Todaka, Yokohama; Toshiro Kinugasa, Hiratsuka; Masaru Noda, Kanagawa; Iwao Aizawa, Yokohama, all of Japan

[73] Assignee: Hitachi, Ltd., Tokyo, Japan

[21] Appl. No.: 99,738

[22] Filed: Sep. 22, 1987

[30] Foreign Application Priority Data

Sep. 22, 1986 [JP] Japan .................................. 61-221841
Sep. 29, 1986 [JP] Japan .................................. 61-228131

[51] Int. Cl.[4] ............................................. H04N 5/335
[52] U.S. Cl. ............................ 358/213.13; 358/213.19
[58] Field of Search ...................... 358/213.13, 213.22, 358/213.12, 213.31, 213.19

[56] References Cited

U.S. PATENT DOCUMENTS 4,531,156  7/1985  Nishizawa et al. ............ 358/213.12
4,589,027  5/1986  Nakamura et al. ............ 358/213.12
4,626,916  12/1986 Todaka et al. .................. 358/213.12
4,774,588  9/1988  Noda et al. ..................... 358/213.19

Primary Examiner—James J. Groody
Assistant Examiner—Robert M. Bauer
Attorney, Agent, or Firm—Antonelli, Terry & Wands

[57] ABSTRACT

Reading horizontal and vertical scanning circuits and a resetting vertical scanning circuit are connected to an image sensor including a plurality of photodiodes arranged in a matrix form. The resetting vertical scanning circuit generates vertical scanning pulses prior to the scanning of the reading vertical scanning circuit by a shutter time $T_S$. Where the reading vertical scanning circuit performs a two-line-at-a-time reading, the resetting vertical scanning circuit also performs the two-line-at-a-time reading. The reading vertical scanning circuit reads the signal of the lines reset by the resetting scanning circuit and outputs it as a video signal.

6 Claims, 18 Drawing Sheets

FIG. 15
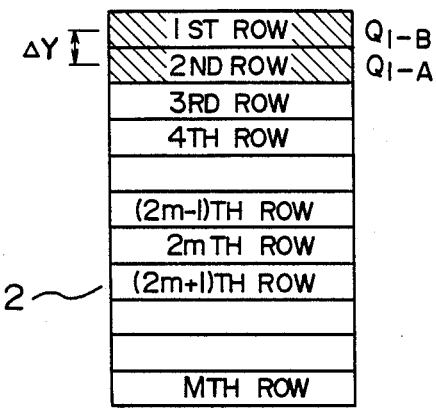
(a) t=t₁
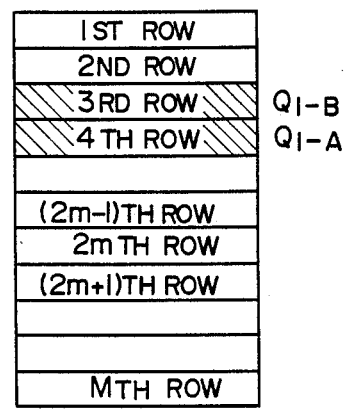
(b) t=t₃
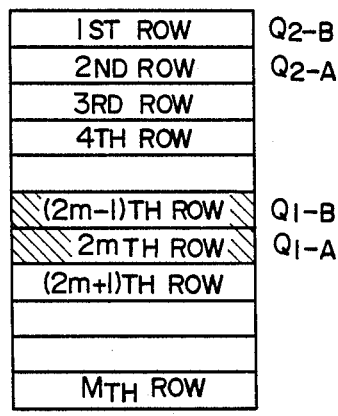
(c) t=t₂ₘ₋₁
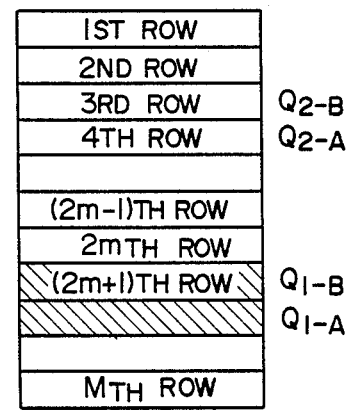
(d) t=t₂ₘ₊₁

FIG. 18

FIG. 19
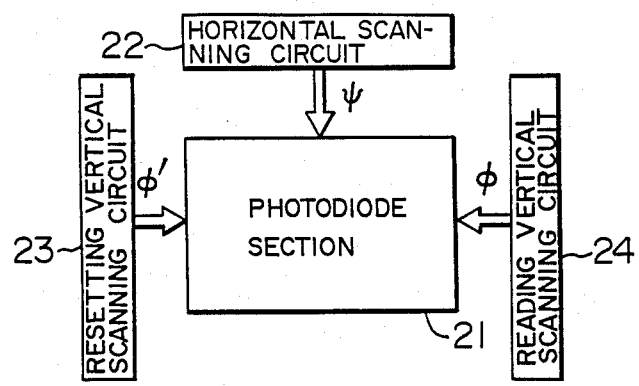
FIG. 20
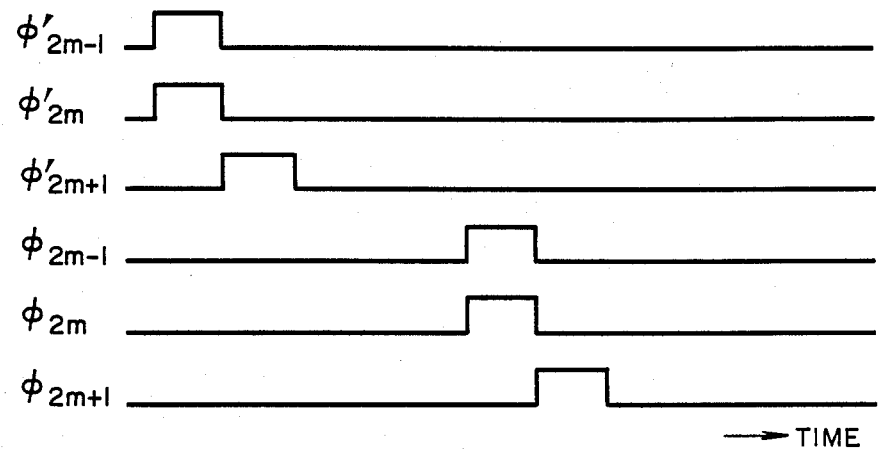
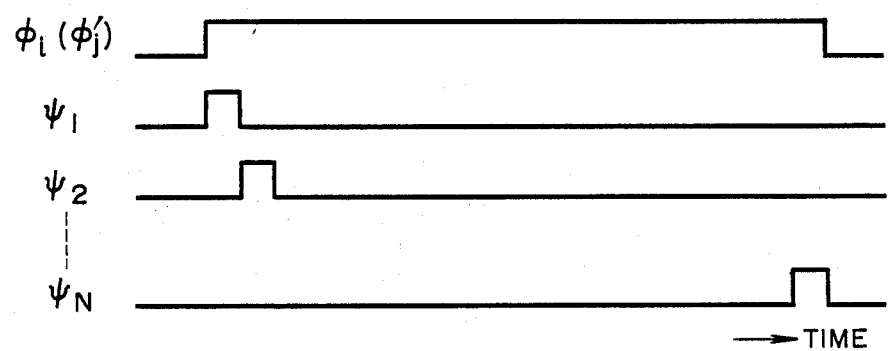

F I G. 21
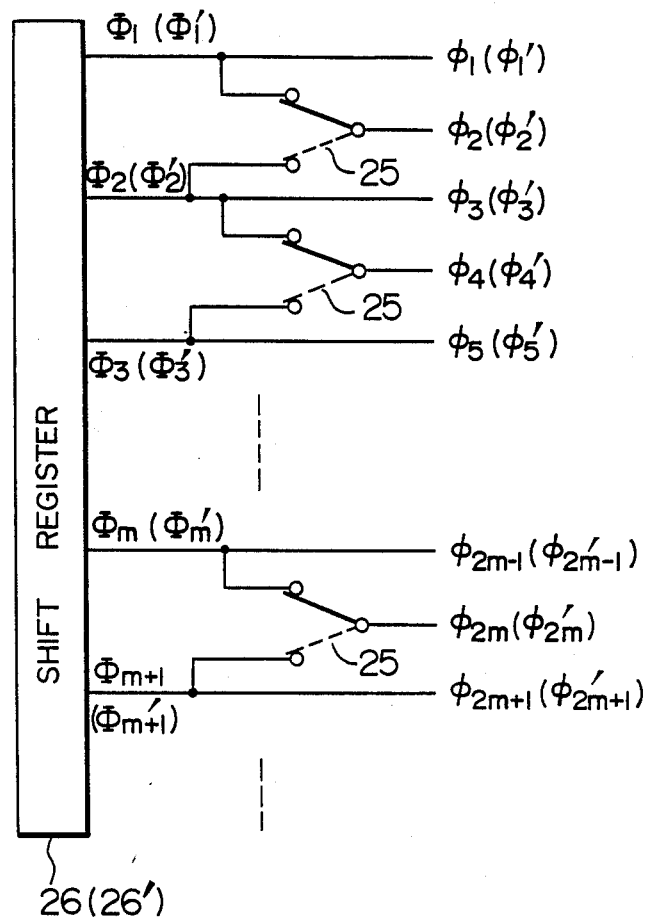

IMAGE PICKUP DEVICE FOR TELEVISION CAMERAS HAVING A SHUTTER FUNCTION FOR A PHOTODIODE MATRIX OPERATED USING MOS SWITCHES

BACKGROUND OF THE INVENTION

The present invention relates to an image pickup device for television cameras which performs a shutter function.

Conventional image pickup devices of the type having a shutter function include, for example, one disclosed in Japanese Patent Application of JP-A-No. 56-44271 and another announced by Takeuchi, etc., at the national convention, 1982, of the Institute of Television Engineers of Japan under the title of "Driving Method for Vertical Overflow-Structure CCD Image Sensor". These devices are designed so that the shutter function is realized by reading the charges stored in the photodiodes prior to the reading of the effective signal by the overflow drains of the CCDs. With the CCD sensor, the vertical CCDs perform a memory function so that if the charges stored in the photodiodes are transferred to the vertical CCDs at the expiration of a given time (determined in accordance with the shutter speed) after the resetting of the photodiodes, the charges produced in the photodiodes during the given time are stored in the vertical CCDs. Then, by successively reading the charges from the vertical CCDs in synchronism with the transmission timing of a television signal, the video signal of a scene exposed for the given time is obtained.

The vertical CCDs function as a memory for one picture or frame. Therefore, any given shutter speed can be realized by selecting a time interval from the resetting of the photodiodes up to the transfer of the charges to the vertical CCDs.

In the case of a MOS sensor, however, a photodiode array is scanned by vertical and horizontal scanning circuits and the charges stored in the photodiodes are successively read. The MOS sensor includes no memory (vertical CCDs) for temporarily storing the charges of all the photodiodes as in the case of the CCD sensor and therefore the shutter function cannot be realized by the method stated in the previously mentioned literature.

On the other hand, if an image sensor adapted for a two-line-at-a-time reading is to be provided with a shutter function, there is a disadvantage that the lines are not the same in signal quantity and therefore flicker is caused in a picture reproduced on the face plate of a television receiver.

SUMMARY OF THE INVENTION

It is an object of the present invention to provide a MOS sensor-type image pickup device for a television camera, in which the MOS sensor is provided with a shutter function without employing any memory.

It is another object of the invention to prevent the occurrence of picture quality deterioration and flicker in an image pickup device of the type employing a two-line simultaneous read-type sensor which simultaneously reads the charges stored in two horizontal lines of photodiodes in a photodiode array.

The image pickup device of this invention includes an array of photodiodes arranged in a matrix form, a horizontal scanning circuit, a first vertical scanning circuit, and a second scanning circuit for clearing the charges stored in the photodiode array row by row. The second vertical scanning circuit reads the signal from the photodiode array prior to the read scanning of the first vertical scanning circuit by a shutter speed or shutter time $T_S$. In the case of the two-line-at-a-time reading-type sensor, the shutter time $T_S$ is preset to an even multiple of the horizontal scanning period to prevent the occurrence of flicker, etc.

BRIEF DESCRIPTION OF THE DRAWINGS

FIGS. 15 and 16 are diagrams for explaining an effect of the embodiment of the invention that the stored charges of the respective lines are made uniform.

FIG. 18 shows diagrams for explaining the interlacing operation.

FIG. 19 is a block diagram showing still another embodiment of the invention which prevents the occurrence of flicker.

FIG. 20 shows a plurality of signal waveforms useful for explaining the operation of the embodiment of FIG. 19.

FIG. 21 is a circuit diagram showing an example of the vertical scanning circuit shown in FIG. 19.

DESCRIPTION OF THE PREFERRED EMBODIMENTS

Figure 1:
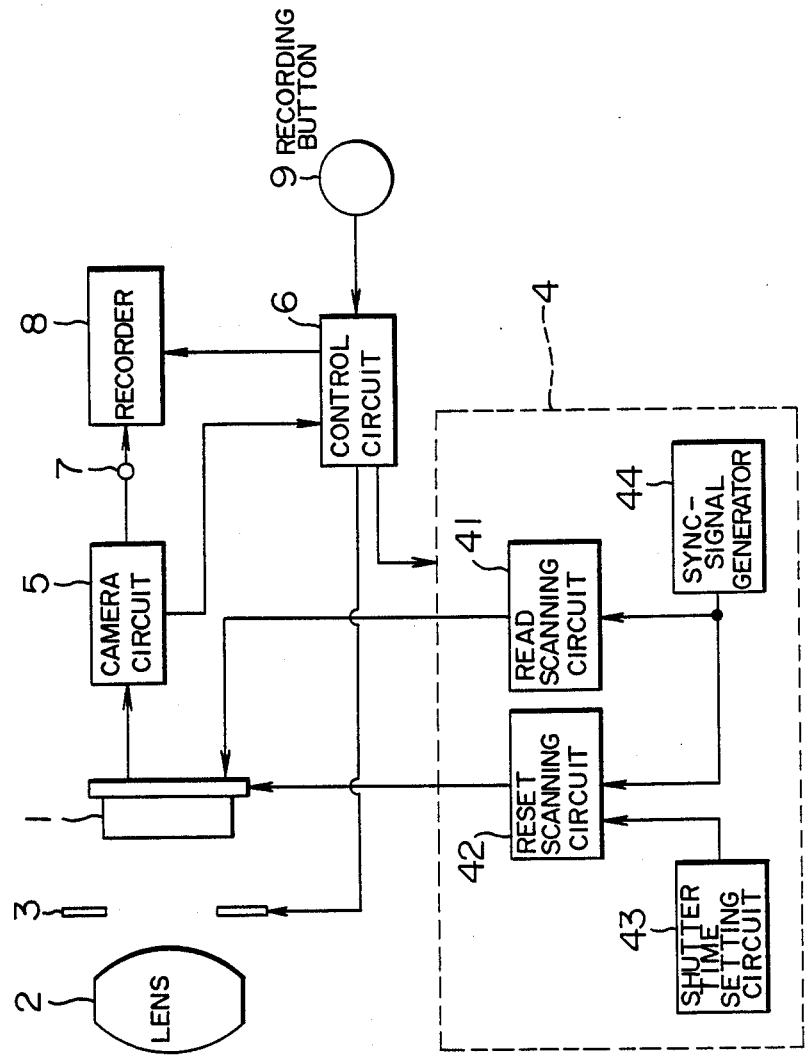
FIG. 1 is a block diagram showing a television camera to which the invention is applied.

Referring to FIG. 1, there is illustrated a television camera to which the invention is applied. The television camera includes an image sensor 1, a lens 2, a stop 3, a drive circuit 4 for driving the sensor 1, a camera circuit 5 for producing a television signal from the output of the image sensor 1, and a control circuit 6. The camera circuit 5 is connected to a recorder (e.g., VTR) 8 through an output terminal 7.

The drive circuit 4 includes a read scanning circuit 41, a reset scanning circuit 42, a shutter time setting circuit 43 and a sync-signal generator 44. The image of an object (not shown) is formed on the sensor 1 by the lens 2 through the stop 3 and the resulting video signal is converted to a television signal by the camera circuit 5, thereby generating the television signal at the output terminal 7. At this time, the drive circuit 4 of the sensor 1 causes the sensor 1 to perform the shutter operation through the reset scanning circuit 42, the read scanning circuit 41 and the shutter time setting circuit 43. The reset scanning circuit 42 receives the shutter time signal from the shutter time setting circuit 43 to perform the calculation of (vertical period $T_V$ - shutter time $T_S$) in response to the vertical synchronizing signal from the sync-signal generator 44 and supply a photodiode read signal prior to the reading of the read scanning circuit 41 by the shutter time $T_S$. Thus, the resulting video signal read from the photodiodes is proportional to the charges stored in the photodiodes during the interval between the resetting of the charges by the reset scanning circuit 42 and the scanning for reading by the read scanning circuit 41.

By presetting the time difference between the reset scanning by the reset scanning circuit 42 and the read scanning by the read scanning circuit 41 to a given time, the exposure time of the photodiodes can be varied to perform the same function as the shutter operation of a 35 mm still picture camera.

The operation of the above-described image pickup device of this invention resembles the operation of the focal-plane shutter in the ordinary 35 mm still picture camera. In the case of the focal-plane shutter, the front and rear curtains scan with a given difference in time therebetween and a slit is formed between the front and rear curtains. Light is passed through the slit and projected onto the film. The width of the slit or the time difference $T_S$ between the front and rear curtains corresponds to the exposure time.

The control circuit 6 is responsive to the luminance signal in the television signal produced by the camera circuit 5 to control the stop 3 and thereby to maintain the desired constant luminance irrespective of the shutter operation speed of the sensor 1.

The control circuit 6 is responsive to the input applied from the shutter speed input unit (not shown) so as to vary the preset value of the shutter time setting circuit 43 and thereby to change the shutter speed. The control circuit 6 is also responsive to the signal from a record button 9 to record the video signal generated from the camera circuit 5 in the recorder 8. The specific methods for presetting a shutter speed, etc., will be described later.

The sensor 1 includes photodiodes corresponding to (m×n) picture elements.

The shutter operation will now be described.

The reset scanning circuit 42 is responsive to the synchronizing signal from the synch-signal generator 44 and the signal from the shutter time setting circuit 43 to start its scanning prior to the scanning of the read scanning circuit 41 by for example $T_S=nH$. As a result of this scanning, the charges in the picture elements 101 are sequentially reset in the order of (1, 1), (1, 2), ... from the first row. The read scanning circuit 41 effects its read scanning at the expiration of nH after the reading of the reset scanning circuit 42. In other words, at the time that the read scanning circuit 42 reads the picture elements (l, m), the reset scanning circuit 41 resets the picture elements (l+n, m). A specific example of this scanning, resetting and reading arrangement will be described later.

The signal read by the read scanning circuit 41 from the photodiodes forming the picture elements is supplied to the camera circuit 5.

Figure 3:
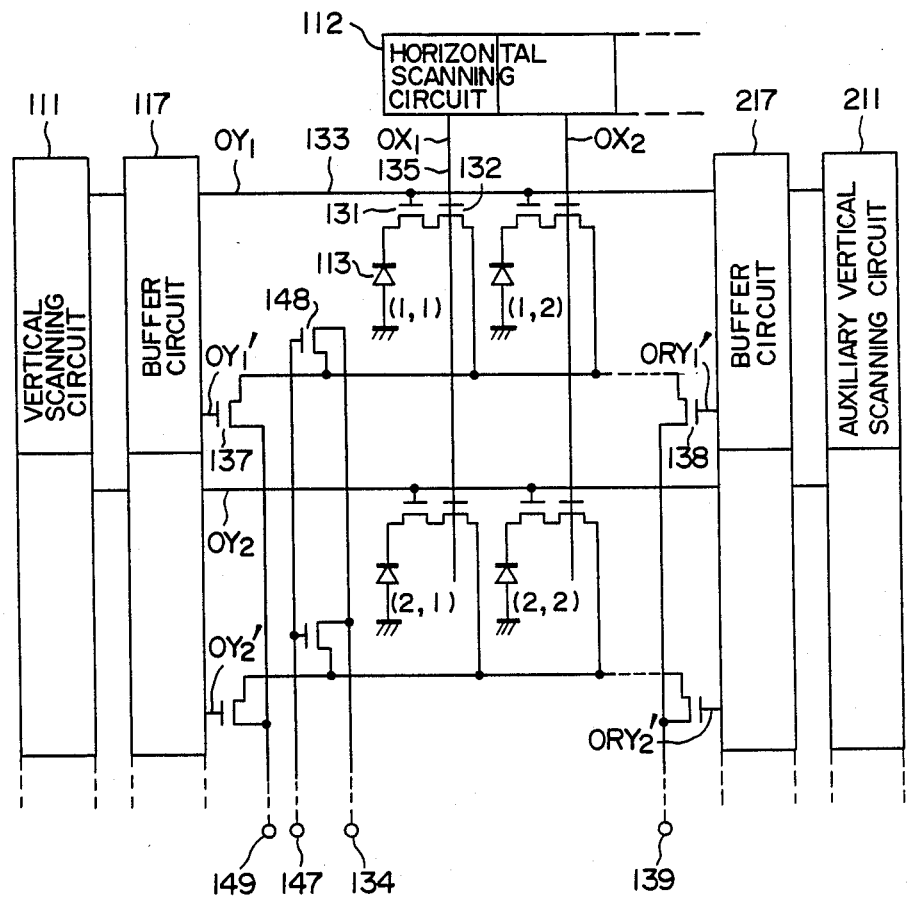
FIG. 3 is a circuit diagram showing an embodiment of the image sensor according to the invention.

FIG. 3 shows detailed circuit constructions of the image sensor 1, the read scanning circuit 41 and the reset scanning circuit 42. The image sensor 1 includes vertical gate lines 135, horizontal gate lines 133, photodiodes 113, horizontal MOS transistors 132, vertical MOS transistors 131, vertical switch MOS transistors 137 and horizontal signal lines 136. The read scanning circuit 41 includes a vertical scanning circuit 111, a horizontal scanning circuit 112, buffer circuits 117 and reset transistors 138. The reset scanning circuit 42 includes an auxiliary vertical scanning circuit 211, buffer circuits 217 and the horizontal scanning circuit 112 which is used in common with the read scanning circuit 41.

The vertical scanning circuit 111 sequentially turns the gate lines $OY_1$, $OY_2$, ... on in synchronism with the vertical scanning timing of the television signal. In the on condition of the gate line $OY_1$, the gate lines $OX_1$, $OX_2$, ... are sequentially turned on by the output of the horizontal scanning circuit 112 so that the charges in the first-line photodiodes 113 are read onto a signal line 149 through the vertical MOS switches 131, the horizontal MOS switches 132, the horizontal signal line 136 and the vertical switch MOS transistor 137. The charges stored in the second-line photodiodes are read in response to the turning on of the gate lines $OX_1$, $OX_2$, ... when the gate line $OY_2$ is turned on. In the like manner, the charges are sequentially read from the third line, fourth line, etc. The buffer circuit 117 is provided simply for the purpose of preventing a concurrence with the operation of the auxiliary vertical scanning circuit 211, as will be described later. In this way, the sensor 1 is read by the scanning of the vertical scanning circuit 111 and the horizontal scanning circuit 112, respectively.

The reset transistors 148 are turned on for every blanking period to remove the so-called smear components produced on the horizontal signal lines 136 by the light leaking thereonto or the like.

As the result of the above-mentioned operation, the video signal is outputted to the signal line 149.

The shutter operation will now be described. The phase of the vertical scanning gate signal supplied from the auxiliary vertical scanning circuit 211 through the buffer circuit 217 leads the gate signal supplied from the vertical scanning circuit 111 through the buffer circuit 117 by l lines.

When the gate $OY_{l'}$ of the horizontal gate line 133 is turned on by the auxiliary scanning circuit 211 and its buffer circuit 217, the gate $ORY_{l}$, of the shutter reset transistor 138 is simultaneously turned on as in the case of the previously mentioned gate lines $OY_1$ and $OY_{1'}$. Thus, if the lth horizontal line $OY_l$ is selected by the auxiliary vertical scanning circuit 211, simultaneously a signal line $ORY_{l'}$ is also turned on so that the charges in the photodiodes (l, 1), (l, 2), (l, 3), ... are sequentially read in response to the turning on of the gate lines $OX_1$, $OX_2$, ... by the horizontal scanning circuit 112 and the thus read charges are discharged to the outside of the sensor 1 through a sensor resetting drain 139 due to the reset transistor 138 being turned on, thereby resetting the photodiodes in the lth line. After the expiration of the time corresponding to the l line period, the gate line $OY_l$ is now turned on by the vertical scanning circuit 111 so that in response to the turning on of the gate line $OY_{l'}$ the video signal is read out to the outside of the sensor 1 through the vertical switch MOS transistor 137 and the signal line 149. By the described operation, the video signal of the lth line photodiodes is read out after the exposure time corresponding to the l lines, that is, in the condition where the shutter is released with the shutter time corresponding to the n line period.

Of course, the resetting and reading of the sensor 1 correspond to the vertical scanning and thus the exposing portion of the shutter takes the form of a slit. The travel time of the slit corresponds to the time of one vertical scanning period and the width of the slit corresponds to the horizontal scanning time for the l lines.

Figure 4:
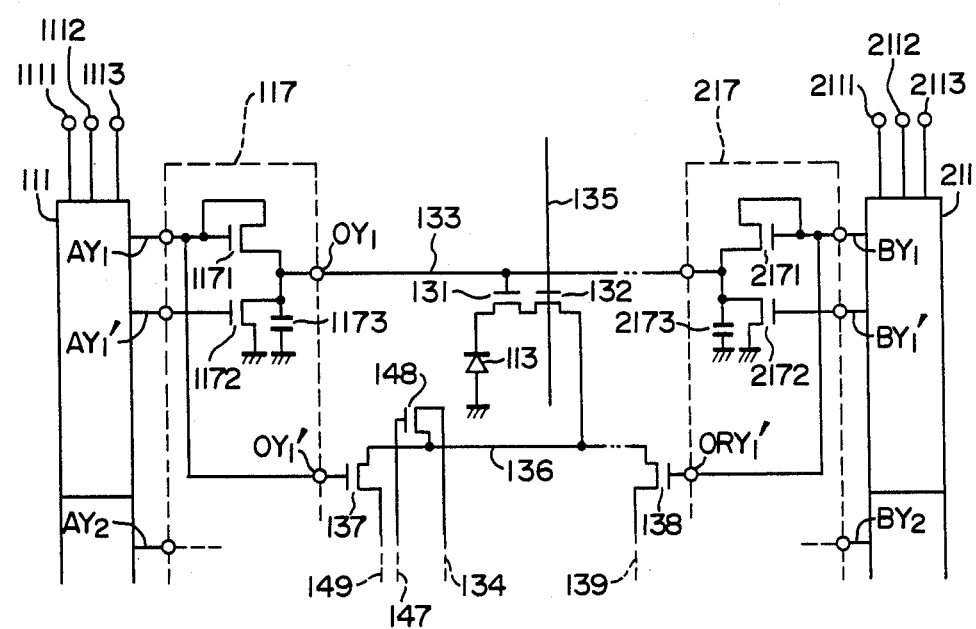
FIG. 4 is a circuit diagram showing the embodiment of FIG. 3 in greater detail.
Figure 5:
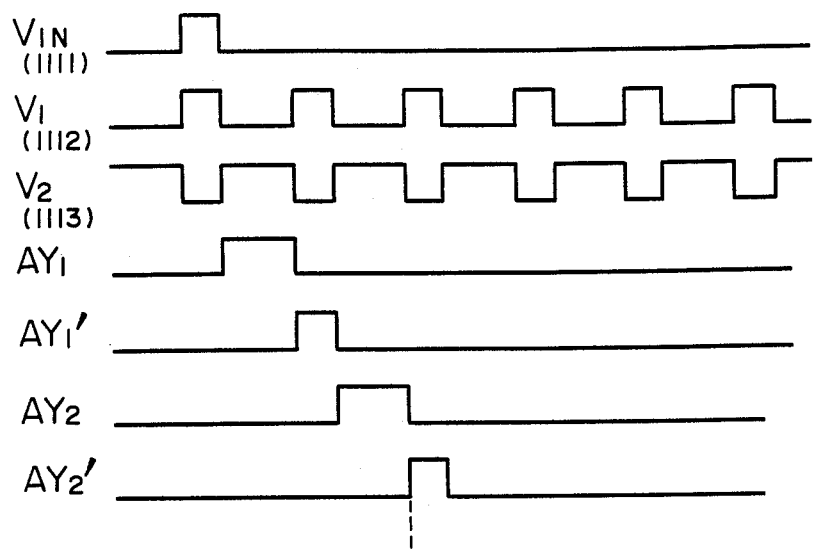
FIG. 5 shows a plurality of signal waveforms useful for explaining the operation of the embodiment shown in FIG. 4.

FIG. 4 shows the circuit construction of the buffer circuits 117 and 217. FIG. 5 shows the signal waveforms generated at various parts of FIG. 4. Each buffer circuit 117 includes MOS transistors 1171 and 1172 and a small-capacity capacitor 1173 and each buffer circuit 217 includes MOS transistors 2171 and 2172 and a small-capacity capacitor 2172.

The signals $AY_1$ and $AY_{1'}$ shown in FIG. 5 are supplied from the vertical scanning circuit 111 to the MOS transistors 1171 and 1172, respectively.

The vertical scanning circuit 111 is formed for example by cascade-connected D-type flip-flops so that the single pulse shown at Vin is used as a start pulse and the pulses shown at $AY_1$, $AY_{1'}$, $AY_2$, $AY_{2'}$, - - - are successively generated in response to the two continuous drive pulses shown at $V_1$ and $V_2$, respectively.

Assuming now that the signal line $AY_1$ of FIG. 4 goes to a high level, the MOS transistor 1171 is turned on so that the signal line $OY_1$ of the horizontal gate line 133 goes to the high level while charging the capacitors 1173 and 2173, thereby selecting the firstline photodiodes. When the signal line AY goes to the high level, the signal line $OY_{1'}$ also goes to the high level and the vertical switch MOS transistor 137 is also turned on. Thus, in response to the signals from the horizontal scanning circuit 112, the vertical gate lines 135 are sequentially turned on in the order of $OX_1$, $OX_2$, . . . and the signal charges in the photodiodes 113 are sequentially read out to the outside of the sensor 1 through the vertical MOS transistors 131, the horizontal MOS transistors 132, the horizontal signal line 136, the vertical switch MOS transistor 137 and the signal line 149.

When the scanning for one line is completed, the signal line $AY_1$ goes to a low level and the MOS transistor 137 is turned off.

On the other hand, a high-level signal is supplied to the signal line $AY_{1'}$ so that the MOS transistor 1172 is turned on and the charge in the capacitor 1173 is discharged, thereby causing the signal line 133 to go to the low level.

Thus, the reading of the charges for one line is completed.

Then, a high-level signal is outputted to a signal line $AY_2$ from the vertical scanning circuit 111 and the charges in the second-line photodiodes are read out. In the like manner, the charges in the photodiodes of all other lines are read out.

The auxiliary vertical scanning circuit 211 and the buffer circuit 217 operate in the like manner.

Due to the provision of the buffer circuits 117 and 217, when the horizontal gate line 133 is scanned by either one of the vertical scanning circuits, the charges in the photodiodes are read out to the outside of the sensor 1 through the vertical switch MOS transistor 137 or the shutter reset transistor 138 on the side of the vertical scanning circuit which has effected the scanning. In other words, the signal charges of the line selected by the vertical scanning circuit 111 are discharged to the outside through the signal line 149 and the signal charges of the line selected by the auxiliary vertical scanning circuit 211 are discharged to the outside through the shutter resetting drain 139. Therefore, a signal can be separately outputted to the outside of the sensor 1 in response to the scanning of each of the two scanning circuits and the photodiodes 113 can be satisfactorily cleared by the reset scanning of the shutter if a low impedance voltage source is connected to the shutter resetting drain 139.

Figure 6:
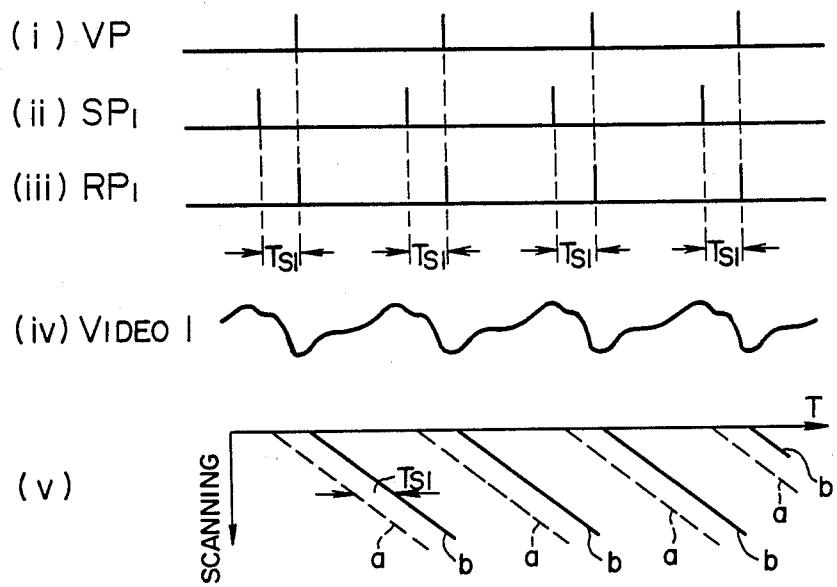
FIGS. 6 and 7 show waveform diagrams useful for explaining the video operation of the embodiment.

FIG. 6 shows a plurality of sensor drive pulse waveforms used in the case employing the sensor of FIG. 3. Designated at VP is the waveform of vertical synchronizing signals, SP the waveform of reset start pulse signals indicative of the timing for starting the scanning of the auxiliary vertical scanning circuit 217, and RP the waveform of read start pulse signals indicative of the timing for starting the scanning of the vertical scanning circuit 111. The time difference $T_{S1}$ between the reset start pulse SP and the read start pulse RP indicates the shutter speed. The waveform diagram of FIG. 6 shows the case where the shutter speed $T_{S1}$ is selected shorter than the vertical synchronizing signal period. FIG. 6 shows the case when the shutter operation is performed for a moving picture. The resulting video signal output waveform is shown at Video 1 in FIG. 6. The diagram of FIG. 6(V) is useful for explaining the shutter operation. Shown at b is the front curtain operation of the auxiliary vertical scanning circuit 211 and shown at a is the rear curtain operation of the vertical scanning circuit 111.

Figure 7:
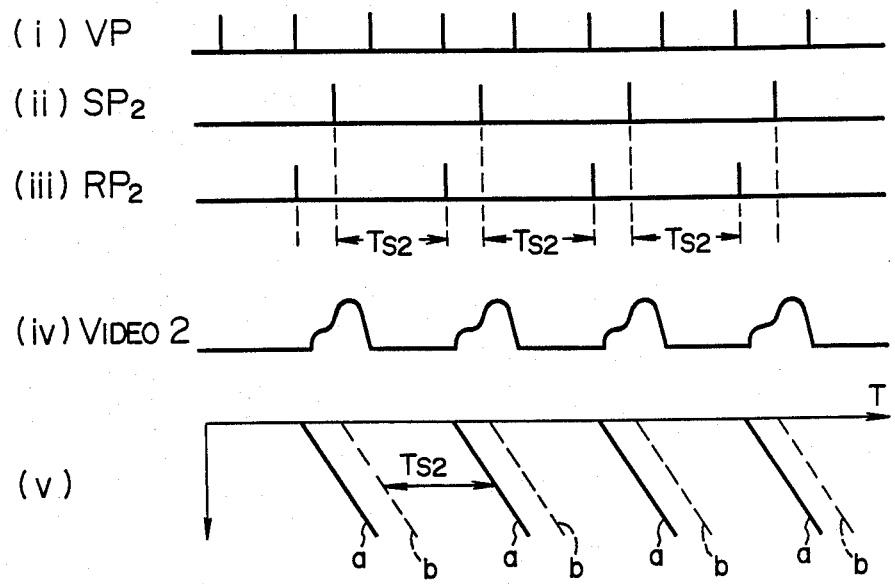

FIG. 7 shows an example of the shutter operation for a moving picture where the shutter speed $T_S$ is selected longer than the vertical synchronizing period.

In the Figure, shown at VP is the waveform of vertical synchronizing signals, RP the waveform of read start pulses and $T_{S2}$ the shutter speed in this case. Of course, the resulting video signal is generated intermittently as shown at Video 2. The diagram shown in (V) is useful for explaining the shutter operation. Since the longer shutter speed $T_S$ than the vertical synchronizing period results in the intermittent video signal, in order to reproduce a correct moving picture, it is necessary to temporarily store the video signal in a memory so as to generate a signal read continuously from the memory.

Figure 8:
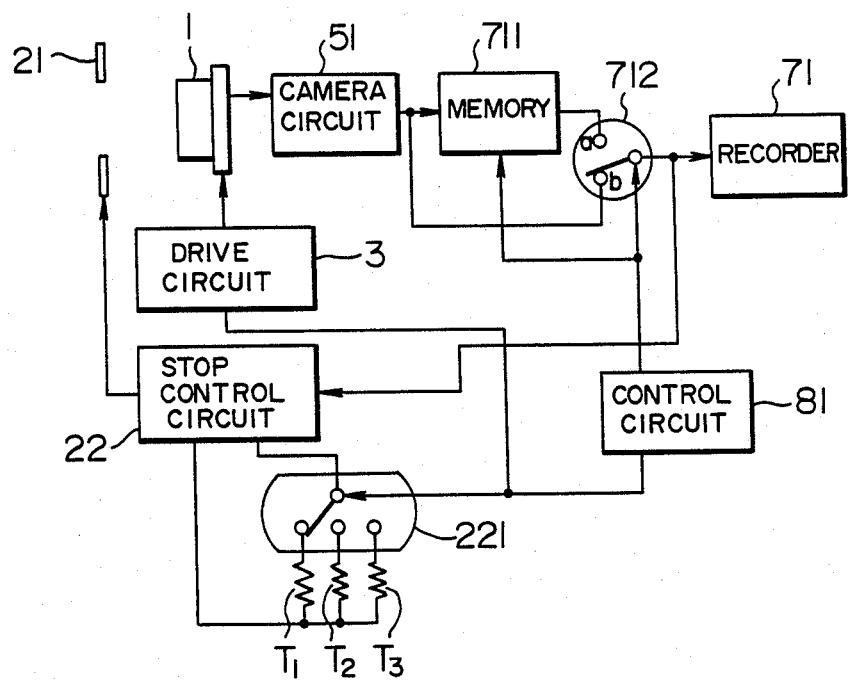
FIG. 8 is a block diagram showing another embodiment of the invention.

Referring to FIG. 8, there is illustrated an embodiment of a television camera including a memory for temporarily storing a video signal. The television camera includes a memory for one picture or frame, a switch 712, a stop control circuit 22, a control circuit 81, a time constant selector switch 221, and resistors $T_1$, $T_2$. . . for determining a time constant.

The switch 712 of FIG. 8 is connected to its position b when the signal from the sensor 1 is read out by the read start pulse RP2 in FIG. 7 (the field). The signal read from the sensor 1 is recorded in the memory 711 simultaneously with its recording in the recorder 71. In the case of the next field, the switch SW 712 is moved to its position a and the signal read from the memory 711 is recorded in the recorder 71. By virtue of this switching operation of the switch SW 712, the continuous video signal is inputted to the recorder 71. The control circuit 81 effects the selection of control time constants for the stop control circuit 22 through the switch SW 221. In this case, if $T_1$ represents the time constant for a field-at-a-time reading, then the occurrence of hunting can be prevented by selecting the time constant $T_2$ for a two-field-at-a-time reading to be $2XT_1$ and the time constant $T_3$ for a three-field-at-a-time reading to be $3XT_1$.

The shutter operation of the moving picture camera has been described by way of its embodiment and it is of course possible to apply the invention to the so-called electronic still picture camera.

Figure 9:
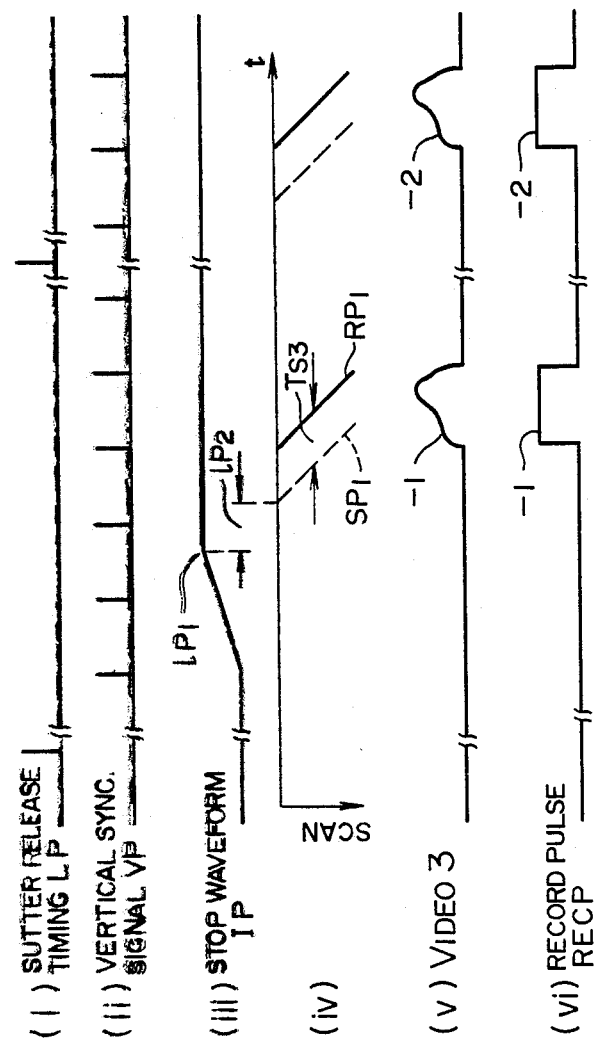
FIG. 9 shows a plurality of signal waveforms useful for explaining the operation of still another embodiment of the invention which is applied to an electronic still picture camera.

FIG. 9 shows a plurality of signal waveforms indicative of the sequence of operations performed when the invention is applied to the electronic still picture camera. In the Figure, the waveform LP shows the timing of releasing the shutter.

The operation will be described as applied to the case of the stored light measuring system. When the release button is depressed, a release pulse LP is generated. Simultaneously the light measurement is started. In the case of the aperture priority system, the desired shutter speed $T_{S3}$ is calculated on the basis of the preset lens aperture value and the result of the light measurement. After the completion of the light measurement, the lens is stopped down to the preset aperture value. After the lens has been stopped down as shown at $iP_1$, a reset start pulse is inputted at the timing of $SP_1$ in the Figure so that after the expiration of the calculated shutter speed $T_{S3}$, a read start pulse is inputted at the timing of $RP_1$ in synchronism with the vertical synchronizing signal VP. The inputting timings $SP_1$ and $RP_1$ of the reset start pulse and the read start pulse can be easily calculated back if the shutter speed $T_{S3}$ and the prefocastable stop-down completion timing are known. For instance, if $T_{S3}=T_{S3'}+n\times V$ (where V is one vertical period), it is only necessary to input a reset start pulse at the expiration of $(V-T_{S3'})$ from the generation of the first vertical synchronizing pulse VP after the completion of the stop down and input a read start pulse in response to the generation of the (n+1)th vertical synchronizing pulse VP.

In this way, the video signal resulting from the releasing of the shutter at the shutter speed $T_{S3}$ is generated as shown at Video 3 in FIG. 9 and it is recorded on a floppy disc or the like in synchronism with a record pulse RECP.

Figure 10:
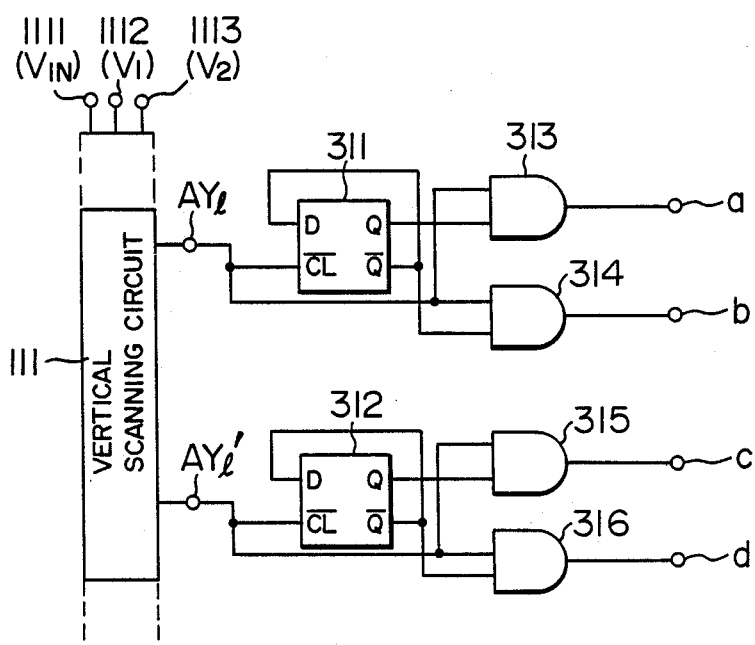
FIG. 10 is a block diagram showing another embodiment of the scanning circuits.
Figure 11:
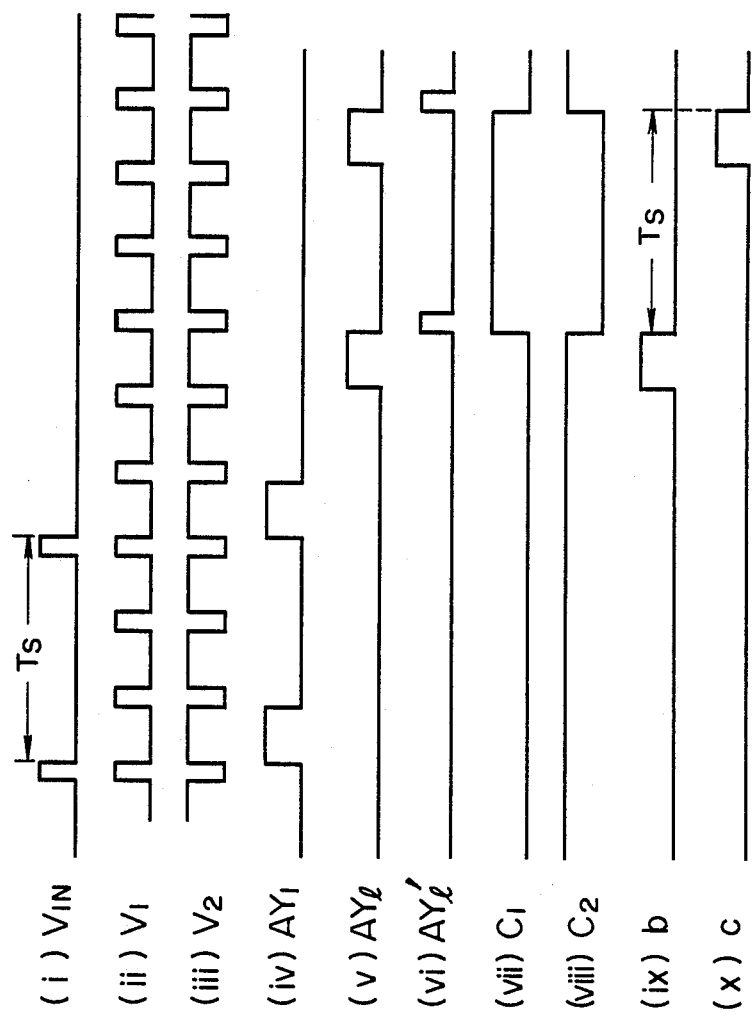
FIG. 11 shows a plurality of signal waveforms useful for explaining the operation of the embodiment of FIG. 10.

While, in the embodiments described above, the vertical scanning circuit 111 and the auxiliary vertical scanning circuit 211 are used to effect the reading and resetting by the separate scanning circuits, it is not always necessary to use two scanning circuits. FIG. 10 shows another embodiment in which the two scanning circuits are combined in one unit, and FIG. 11 shows a plurality of signal waveforms useful for explaining the operation of this embodiment. In FIG. 10, each of D-type flip-flops 311 and 312 has a clock input terminal $\overline{CL}$. For purposes of simplicity, it is assumed that each of the D-type flip-flops 311 and 312 latches its input terminal D when the clock input terminal $\overline{CL}$ goes to the low level.

An AND circuit 313 is connected to the signal line $AY_l$ of FIG. 4 and an AND circuit 315 is connected to the signal line $AY_{l'}$ of FIG. 4. An AND circuit 314 is connected to the signal line $BY_l$ of FIG. 4 and an AND circuit 316 is connected to the signal line $BY_{l'}$ of FIG. 4.

When a pulse $V_{in}$ of a time interval corresponding to the shutter speed is applied to the start pulse input terminal 1111 of the vertical scanning circuit 111, each of the D-type flip-flops 311 and 312 changes its state two times so that two pulses spaced in time by the shutter speed $T_S$ are respectively generated between terminals a and b and between terminals c and d in synchronism with the drive clock pulses $V_1$ and $V_2$, respectively. The outputs at the terminals b and d are applied to the buffer circuit 217 of FIG. 4 and the photodiodes are reset. The outputs at the terminals a and c are applied to the buffer circuit 117 and the signal is read from the photodiodes.

From the foregoing description it will be seen that the necessary circuit for performing the scanning for resetting and the scanning for reading can be easily provided by the single scanning circuit. Thus, it is not necessary to provide two scanning circuits entirely independently of each other and the sensor construction can be made simpler by this embodiment.

Next, a description will be made of a television camera to which the invention is applied and which is designed to produce a color video signal.

To produce a color signal, three or four different color filters are formed on picture elements comprising a photodiode matrix and the picture element signals of the adjacent two lines are read simultaneously. For instance, the (2m−1)th and mth lines (m=1, 2,- - -) are read simultaneously.

In the case of a television camera of the interlaced scanning type, however, the lines to be read simultaneously differ between an odd field and an even field. When the signal of the (2m−1)th and 2mth lines read simultaneously in the odd field, the 2mth and (2m+1)th lines are read simultaneously in the even field.

Thus, if the proper reset timings are not set for the odd and even fields, there is an ill effect of causing the difference in exposure time between the adjacent lines.

In addition, the exposure time differs with different fields with the resulting danger of causing flicker.

Figure 12:
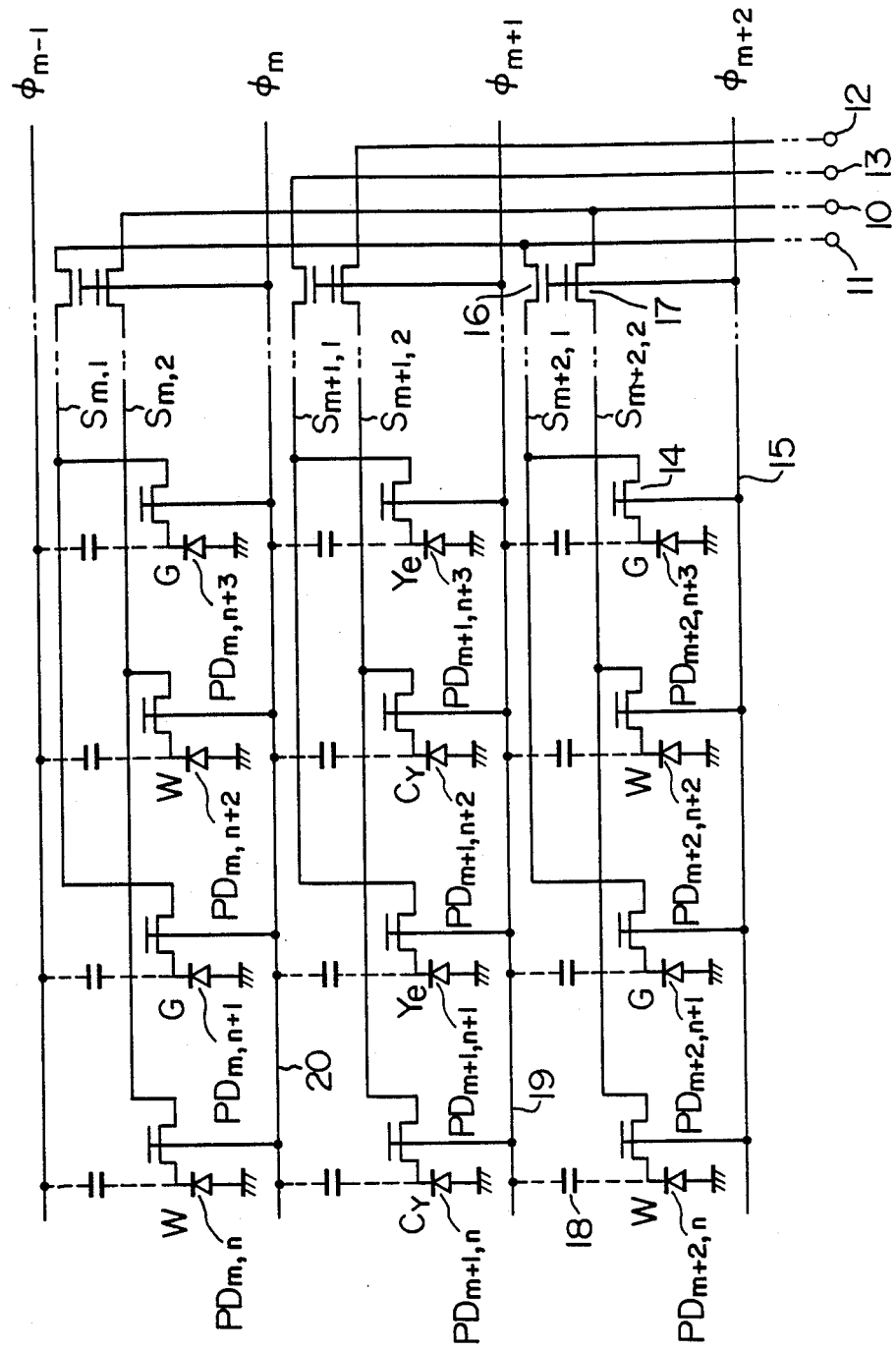
FIG. 12 is a circuit diagram showing an example of the two-line-at-a-time reading-type MOS sensor.

Referring now to FIG. 12, there is illustrated a detailed circuit diagram of a sensor 1 designed to effect a two-line-at-a-time reading. The horizontal and vertical scanning circuits, etc., are not shown.

In the Figure, reference symbol PD designates photodiodes forming picture elements, and subindices m and n designate the array positions of the photodiodes, i.e., their row and column positions. For instance, symbol $PD_{m,n}$ designates the photodiode at the mth row and the nth column. Symbol S designates horizontal signal lines and a subscript m designate the row of the horizontal signal lines. Also, the two horizontal signal lines are provided for each row and they are respectively designated by subscripts 1 and 2. For instance, designated at $S_{m,1}$ and $S_{m,2}$ are the two horizontal signal lines for the mth row.

Filters W (white), G (green), W, G, ... and filters Cy (cyan), Ye (yellow), Cy, Ye, .... are alternately placed over the photodiodes PD on every third row.

The horizontal signal lines $S_{m,1}$, $S_{m,2}$, $S_{m+1,1}$ and $S_{m+1,2}$ are respectively alternately connected to every other photodiode to output W, G, Cy and Ye signals to signal output terminals 10, 11, 12 and 13, respectively. The photodiodes are respectively connected to the horizontal signal lines $S_{m,n}$ through vertical switching MOS transistors 14, and the horizontal signal lines $S_{m,n}$ are connected to the output terminals 10, 11, 12 and 13 through row selecting switches 16 and 17. The gate of each vertical switching MOS transistor 14 is connected to a vertical gate line 15. A selection pulse $\phi m$ is supplied to each of the vertical gate lines 15.

The occurrence of flicker will now be described by taking the case of reading the signal from the (m+1)th and (m+2)th row with reference to FIGS. 13 and 14.

Assuming now that the mth row and the (m+1)th row are selected simultaneously in a certain field (referred to as an A-field), in the next field (referred to as a B-field) the mth row is selected simultaneously with the (m−1)th row and the (m+1)th row is selected simultaneously with the (m+2)th row. As a result, the necessary selection pulses $\phi_m$, $\phi_{m+1}$ and $\phi_{m+2}$ for effecting the interlaced scanning take the waveforms as shown in FIG. 13. Thus, the giving and taking of the charges through coupling capacitors 18 occur as shown at times $t_1$ to $t_4$ in FIG. 13.

Noting first the photodiodes $PD_{m+1}$ in the (m+1)th row, the selection pulse $\phi_{m+1}$ goes to the high level at the time $t_1$ and the charge is stored in the photodiodes $PD_{m+1}$. At this time, the selection pulse $\phi_m$ (the same as the selection pulse $\phi_{m+1}$ in this field) is applied to a gate signal line 20 (connected to the photodiodes $PD_m$) which adjoins the photodiodes $PD_{m+1}$ so that charge is also stored in the photodiodes $PD_{m+1}$ by the coupling capacitors 18 between the photodiodes $PD_{m+1}$ and the gate signal line 20. The charge stored in the photodiodes $PD_{m+1}$ by the coupling capacitors 18 is indicated at $+\Delta$. This charge caused by the coupling capacitors 18 is a cause of flicker.

At the time $t_1$, the stored charge is increased by $\Delta$ due to the selection pulse $\phi_m$ going to the high level. During an interval $T_1$, this $+\Delta$ charge is read from the output terminals 12 and 13 through the two horizontal signal lines $S_{m+1}$ in response to the scanning of the horizontal scanning circuit which is not shown. As a result, the stored charge of the photodiodes $PD_{m+1}$ is reset (designated as 0).

At the next time $t_2$, conversely the stored charge of the photodiodes $PD_{m+1}$ is decreased by $\Delta$ (designated as $-\Delta$) by the negative transition of the selection pulse $\phi_m$. This $-\Delta$ charge is held up to just before (the time $t_3$) a read interval $T_4$ of the photodiodes $PD_{m+1}$ in the B-field. In the interval $T_4$, the $-\Delta$ stored charge of the photodiodes $PD_{m+1}$ is outputted to the output terminals 12 and 13 through the horizontal signal lines $S_{m+1}$. As a result, the stored charge of the photodiodes $PD_{m+1}$ is reset. It is to be noted that since the interlaced scanning is effected, the selection pulse $\phi_m$ has no effect on the photodiodes $PD_{m+1}$ in the B-field.

Then, in the next A-field, the $+\Delta$ stored charge is read out in the above-mentioned manner. As a result, the $+\Delta$ and $-\Delta$ stored charges are alternately read from the photodiodes $PD_{m+1}$ *for every field*.

Figure 13:
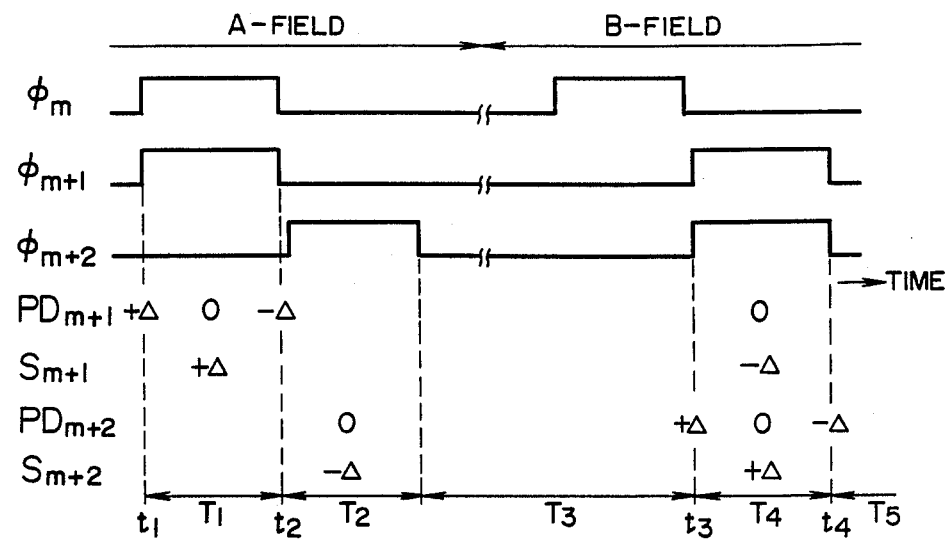
FIGS. 13 and 14 are waveform diagrams useful for explaining the operation of the MOS sensor of FIG. 12.

Next, noting the photodiodes $PD_{m+2}$, as will be seen from FIG. 13, it is understood that due to the effects of the positive and negative transitions of the selection pulse $\phi_{m+1}$ in the B-field, the $-\Delta$ stored charge is read in the A-field and the $+\Delta$ stored charge is read in the B-field in contrast with the case of the photodiodes $PD_{m+1}$.

Figure 14:
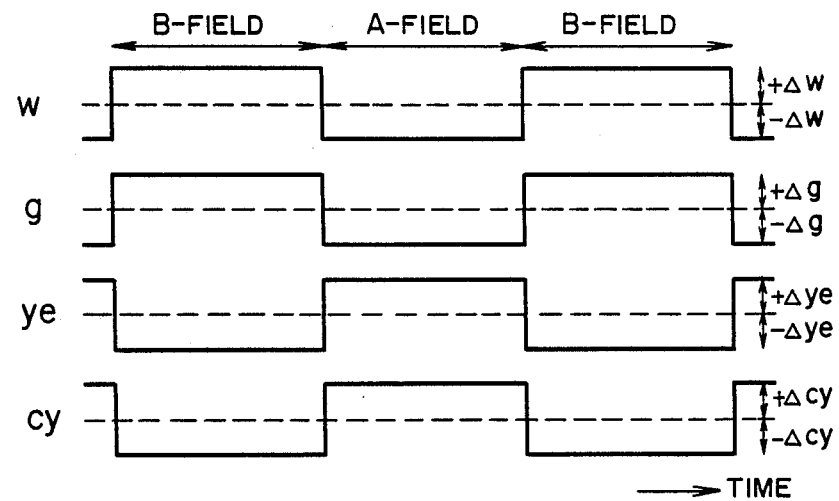

Thus, as shown in FIG. 12, taking the case of a MOS sensor of the type in which white (W), yellow (Ye), cyan (Cy) and green (G) color filters are arranged over photodiodes, the output signals corresponding to the respective color filters have the waveforms as shown in FIG. 14. In the case of FIG. 14, only the signals resulting from the charges stored by the coupling capacitors 18 are shown.

It is to be noted that in FIG. 14 symbols $\Delta w$, $\Delta ye$, $\Delta cy$ and $\Delta g$ respectively show the previously mentioned charge variations of the photodiodes respectively provided with the color filters W, Ye, Cy and G. Here, the previously mentioned output signals w, ye, cy and g can respectively be given by the following equations.

(i) A-field $$w = w' - \Delta w \\ ye = ye' + \Delta ye \\ cy = cy' + \Delta cy \\ g = g' - \Delta g \quad\quad (1)$$

(ii) B-field $$w = w' + \Delta w \\ ye = ye' - \Delta ye \\ cy = cy' - \Delta cy \\ g = g' + \Delta g \quad\quad (2)$$

Note that in equations (1) and (2) symbols $w'$, $ye'$, $cy'$ and $g'$ respectively indicate the signal charges of the output signals w, ye, cy and g in the absence of the coupling capacitors 18.

From equations (1) and (2), the luminance signal Y and the color signals R (red) and B (blue) are given as follows.

(i) A-field $$\begin{aligned} Y &= a_1 w + a_2 ye + a_3 cy + a_4 g \\ &= a_1 w' + a_2 ye' + a_3 cy' + a_4 g' - \\ &\quad (a_1 \Delta w - a_2 \Delta ye - a_3 \Delta cy + a_4 \Delta g) \\ &= Y' - \delta_Y \end{aligned} \quad (3)$$

$$\begin{aligned} R &= b_1 w + b_2 ye + b_3 cy - b_4 g \\ &= b_1 w' + b_2 ye' - b_3 cy' - b_4 g' - \\ &\quad (b_1 \Delta w - b_2 \Delta ye + b_3 \Delta cy - b_4 \Delta g) \\ &= R' - \delta_R \end{aligned} \quad (4)$$

$$\begin{aligned} B &= c_1 w - c_2 ye + c_3 cy - c_4 g \\ &= c_1 w' - c_2 ye' + c_3 cy' - c_4 g' - \\ &\quad (c_1 \Delta w + c_2 \Delta ye - c_3 \Delta cy - c_4 \Delta g) \\ &= B' - \delta_B \end{aligned} \quad (5)$$

(ii) B-field $$Y = Y' + \delta_Y \quad (6)$$
$$R = R' + \delta_R \quad (7)$$
$$B = B' + \delta_B \quad (8)$$

Here, $Y'$, $R'$, $B'$ and $\delta_Y$, $\delta_R$, $\delta_B$ in equations (3) to (8) are as given by the folowing equations (9) and (10), and $Y'$, $R'$ and $B'$ show respectively the normal signal charges of the luminance signal Y and the color signals R and B. Also, $a_1$ to $a_4$, $b_1$ to $b_4$ and $c_1$ to $c_4$ represent matrix coefficients.

$$Y = a_1w' + a_2ye' + a_3cy' + a_4g' \\ R' = b_1w' + b_2ye' - b_3cy' - b_4g' \\ B' = c_1w' - c_2ye' + c_3cy' - c_4g' \quad\quad (9)$$

$$\delta_Y = a_1\Delta w - a_2\Delta ye - a_3\Delta cy + a_4\Delta g \\ \delta_R = b_1\Delta w - b_2\Delta ye + b_3\Delta cy - b_4\Delta g \\ \delta_B = c_1\Delta w + c_2\Delta ye + c_3\Delta cy - c_4\Delta g \quad\quad (10)$$

As will be seen from the foregoing description, it is understood that the luminance signal Y and the color signals R and B produced from the MOS sensor of FIG. 12 are respectively varied in signal level by $\delta_Y$, $\delta_R$ and $\delta_B$ for every field, thereby causing the so-called flicker. As a result, the picture quality is deteriorated considerably.

However, in the MOS sensor the patterns of the photodiodes and the vertical gate lines are arranged regularly as shown in FIG. 12 and therefore it is possible to consider that $\Delta w = \Delta ye = \Delta cy = \Delta g$. Thus, by representing the matrix coefficients by the following equations (11) to (13), there result $\delta_Y = \delta_R = \delta_B = 0$ and the occurrence of flicker is prevented.

$$a_1 = a_2 = a_3 = a_4 \quad\quad (11)$$

$$b_1 = b_2 = b_3 = b_4 \quad\quad (12)$$

$$c_1 = c_2 = c_3 = c_4 \quad\quad (13)$$

However, the condition of equation (11) deviates from the condition of the minimum moiré. Also, usually the proper color reproduction cannot be ensured by the conditions of equations (12) and (13). Thus, eventually it is difficult to satisfy the conditions of equations (11) to (13) and therefore it is impossible to avoid the occurrence of flicker.

However, by applying the invention to a MOS sensor of the two-line-at-a-time reading type, the occurrence of flicker can be prevented.

The occurrence of flicker can be prevented by selecting those lines which are to be reset prior to the reading of a video signal in the following manner.

Where the (2m−1)th row and the mth row (m=1, 2,---) are selected as the rows to be read, the (2m'−1)th row and the 2m'th row (m'=1, 2---, m'≠m) are simultaneously selected as the ones which are to be read. (The number of rows between the reset rows and the read rows is assumed to be even).

This is equivalent to the fact that the interval between the read rows in the nth field and the rows to be reset for signal reading purposes in the next (n+1)th field is an odd number of the rows.

The fact that the above-mentioned selection of reset rows results in a uniform exposure time in the row direction will now be described.

Figure 16:
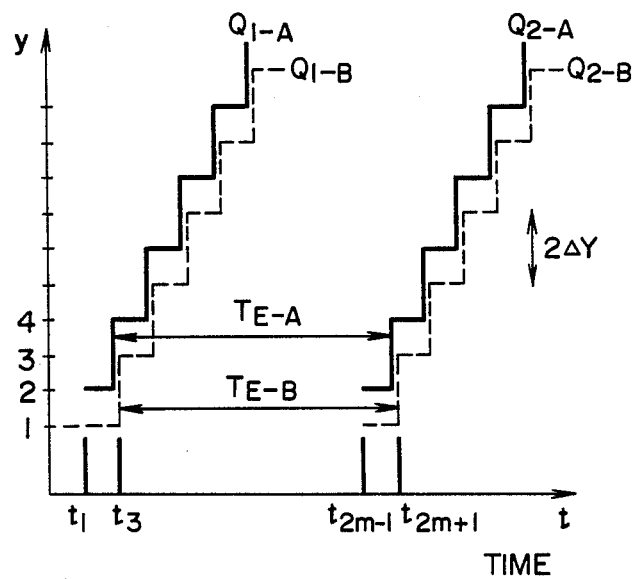

FIG. 15 shows the manner in which the signal is read when the (2m−1)th row and the 2mth row (m=1, 2,---) are selected as the read rows and simultaneously the (2m'-1)th row and the 2m'th row (m'=1, 2,... m'≠m) are selected as the reset rows. In the Figure, the shaded portions are the reset rows which are respectively designated as $Q_{1-A}$ and $Q_{1-B}$. $Q_{2-A}$ and $Q_{2-B}$ show the positions of the two read rows. FIG. 16 shows the changes in time of the positions $Q_{1-A}$, $Q_{1-B}$, $Q_{2-A}$ and $Q_{2-B}$.

In the Figure, $Q_{1-A}$ shows the position of the even-numbered reset row. Also, $Q_{1-B}$ shows the reset position of the odd-numbered row. The first and second rows are reset at a time $t_1$ and the third and fourth rows are reset at a time $t_3$. It will also be seen from FIG. 16 that the signal is read from the first and second rows at a time $t_{2m-1}$ and the signal is read from the third and fourth rows at a time $t_{2m+1}$.

In the case of the (2m−1)th row or the odd-numbered row, the time difference $T_{E-B}$ between the dotted-line reset position $Q_{1-B}$ and the dotted-line read position $Q_{2-B}$ in FIG. 16 corresponds to the exposure time. With the 2mth row or the even-numbered row, the time difference TE-A between the broken-line reset position $Q_{1-A}$ and the broken-line read position $Q_{2-A}$ in FIG. 16 corresponds to the exposure time. If the number of rows between the reset rows and the read rows is even, the time changes of $Q_{1-A}$ and $Q_{1-B}$ are equivalent to parallelly moving the graphs of $Q_{2-A}$ and $Q_{2-B}$ in the direction of the time axis in FIG. 16 and in principle the exposure time becomes $T_{E-A} = T_{E-B}$. The rows to be reset need not be two as in the case of the (2m−1)th row and the 2mth row and every three or more rows may be reset as in the case of the (2m−1)th row, the 2mth row, the (2m+1)th row, ----.

Figure 17:
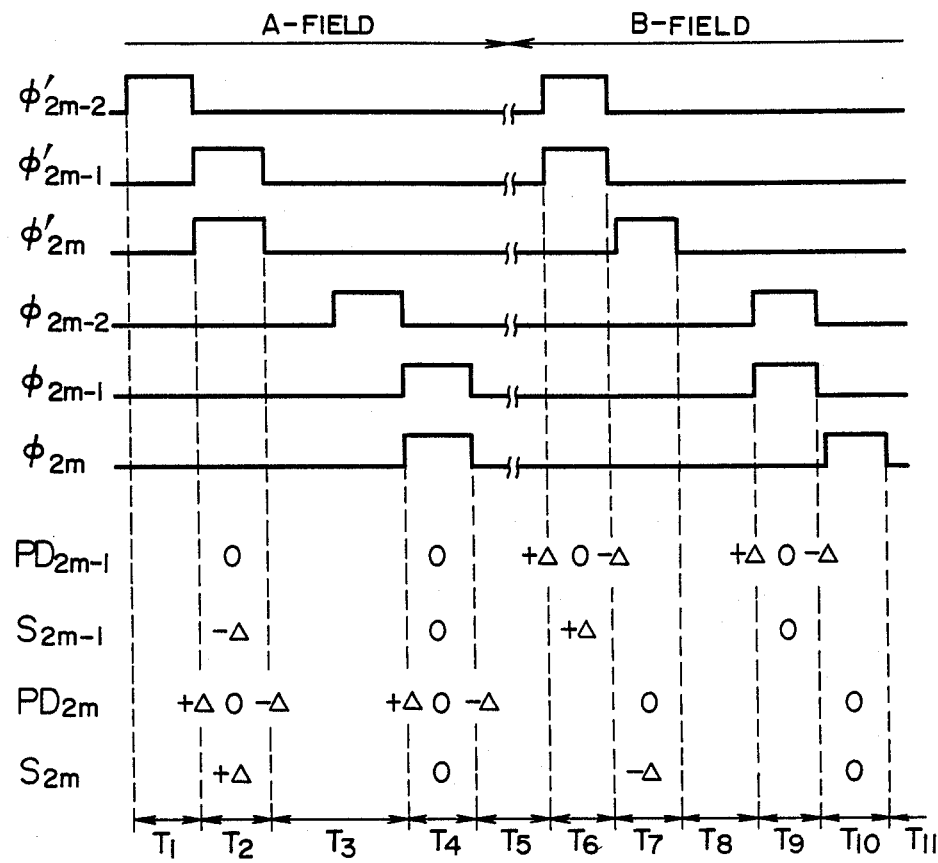
FIG. 17 is a diagram for explaining another effect of the embodiment of the invention, i.e., the prevention of flicker.

Next, the reason for the nonoccurrence of flicker will be described. The description will be made with reference to FIG. 17 by taking the case of the construction of the photodiode section shown in FIG. 12 and utilizing the same method as in the case of FIG. 13. In FIG. 17, symbol $\phi'$ designates resetting selection pulses and $\phi$ reading selection pulses. For instance, selection pulses $\phi'_{2m}$ and $\phi_{2m}$ are respectively a reset pulse and a reading selection pulse for selecting photodiodes $PD_{2m}$.

If the spacing between the reset rows and the read rows is an even number of the rows and the interlaced scanning is effected, the timings of the selection pulses $\phi'$ and $\phi$ become as shown in FIG. 17. Noting now the photodiodes $PD_{2m-1}$, in the A-field the undesired $-\Delta$ charge is discharged in a reset period $T_2$ and no undesired charge is read out in a read period $T_4$. Also, in the B-field the undesired $+\Delta$ charge is discharged in a reset period $T_6$ and no undesired charge is read out in a read period $T_9$. Also, noting the photodiodes $PD_{2m}$, the undesired $+\Delta$ and $-\Delta$ charges are respectively read in reset periods $T_2$ and $T_7$ and no undesired charges are read out in read periods $T_4$ and $T_{10}$, respectively.

The reason for this is as follows. In other words, to select the spacing between the reset rows and the read rows to be an even number of the rows is no more than that the selection pulses $\phi'$ and $\phi$ are placed in the same mode (the combination of the photodiodes to be selected simultaneously in a certain field are the same for both the resetting and reading), so that if the photodiodes are selected twice in the same mode, due to the undesired charge of the reverse polarity produced in the photodiodes at the time of the first selection, at the time of the second selection the undesired $\pm\Delta$ charges just cancel each other and they are not read out to the signal output terminals.

Figure 18:
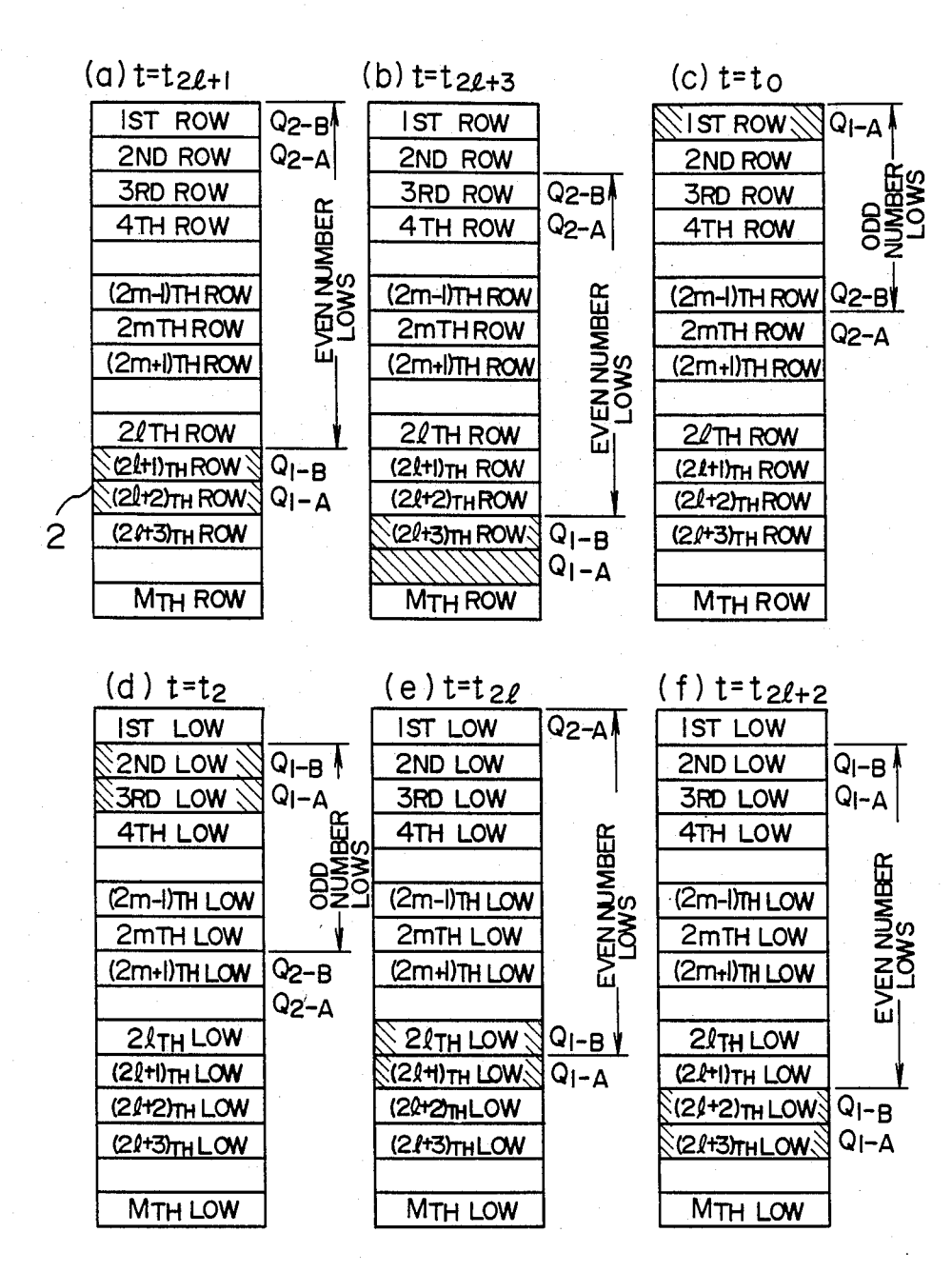

Referring now to FIG. 18, there is illustrated the manner in which a signal is read over two or more fields. Read positions $Q_{2-A}$ and $Q_{2-B}$ are successively moved from the second and first rows to the fourth and third rows to ----, thereby completing the selection of all the rows up to the Mth row as shown in (a) to (d) of FIG. 18. In the next field, the interlaced scanning is performed so that the read positions $Q_{2-A}$ and $Q_{2-B}$ are moved successively from the third and second rows to . . . with the combination of the first row only being changed as shown in (e) and (f) of FIG. 18. In (c) and (d) of FIG. 18, the resetting for the reading of the next field is effected at $Q_{1-A}$ and $Q_{1-B}$ rows while the reading of the $Q_{2-A}$ and $Q_{2-B}$ rows is effected. As shown in (c) and (d) of FIG. 18, the row spacing between the reset rows in the next field and the read rows in the current field includes an odd number of the rows. This is due to the use of the interlaced reading.

Now noting for example the second and third rows, they are reset simultaneously at a time $t=t_2$ and thereafter they are read simultaneously at a time $t=t_{2l+2}$. By thus making same the combination of rows to be reset and the combination of rows to be read, no flicker is read out.

Referring to FIG. 19, there is illustrated an image pickup device for a television camera according to another embodiment of the invention, which is designed to prevent the occurrence of flicker by utilizing the above-mentioned preselection of reset rows and read rows.

The image pickup device includes a photosensitive section 21 including photodiodes, vertical MOS switches, etc., a horizontal scanning circuit 22, a reset vertical scanning circuit 23 and a read vertical scanning circuit 24. The horizontal scanning circuit 22, the reset vertical scanning circuit 23 and the read vertical scanning circuit 24 respectively supply horizontal selection pulses, reading vertical selection pulses and resetting vertical selection pulses to the photosensitive section 21.

FIG. 20 shows the waveforms of these three selection pulses. In the Figure, the subscripts of $\phi$ and $\phi'$ indicate the row numbers of the photodiodes to be selected and the subscripts of $\psi$ indicate the column numbers of the photodiodes to be selected.

The reset vertical scanning circuit 23 generates a resetting vertical selection pulse $\phi'$ which is displaced by a given time $T_S$ from a reading vertical selection pulse (the time $T_S$ is determined such that the number of the rows between the reset rows and the read rows is odd). FIG. 21 shows the construction of the vertical scanning circuits 23 and 24 in detail. In the Figure, numeral 25 designates switches, and 26 a conventional shift register. Two units of the circuitry of FIG. 21 are respectively used for reading and resetting purposes. The operation of this circuit construction will be described with reference to the timing chart of FIG. 22.

Figure 2:
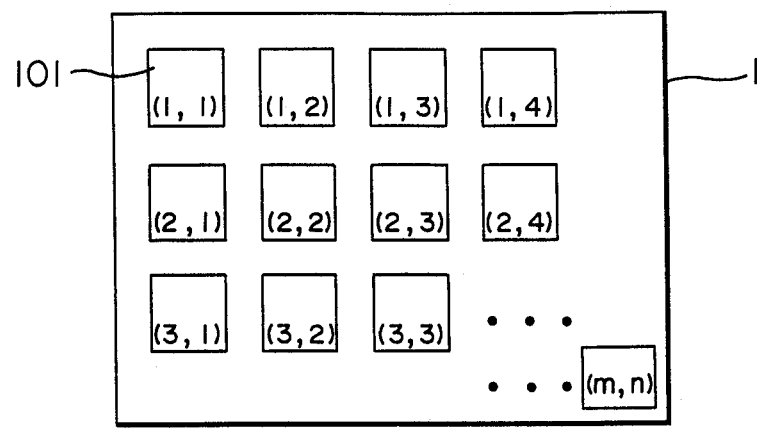
FIG. 2 is a diagram showing the arrangement of picture elements in the image sensor.
Figure 22:
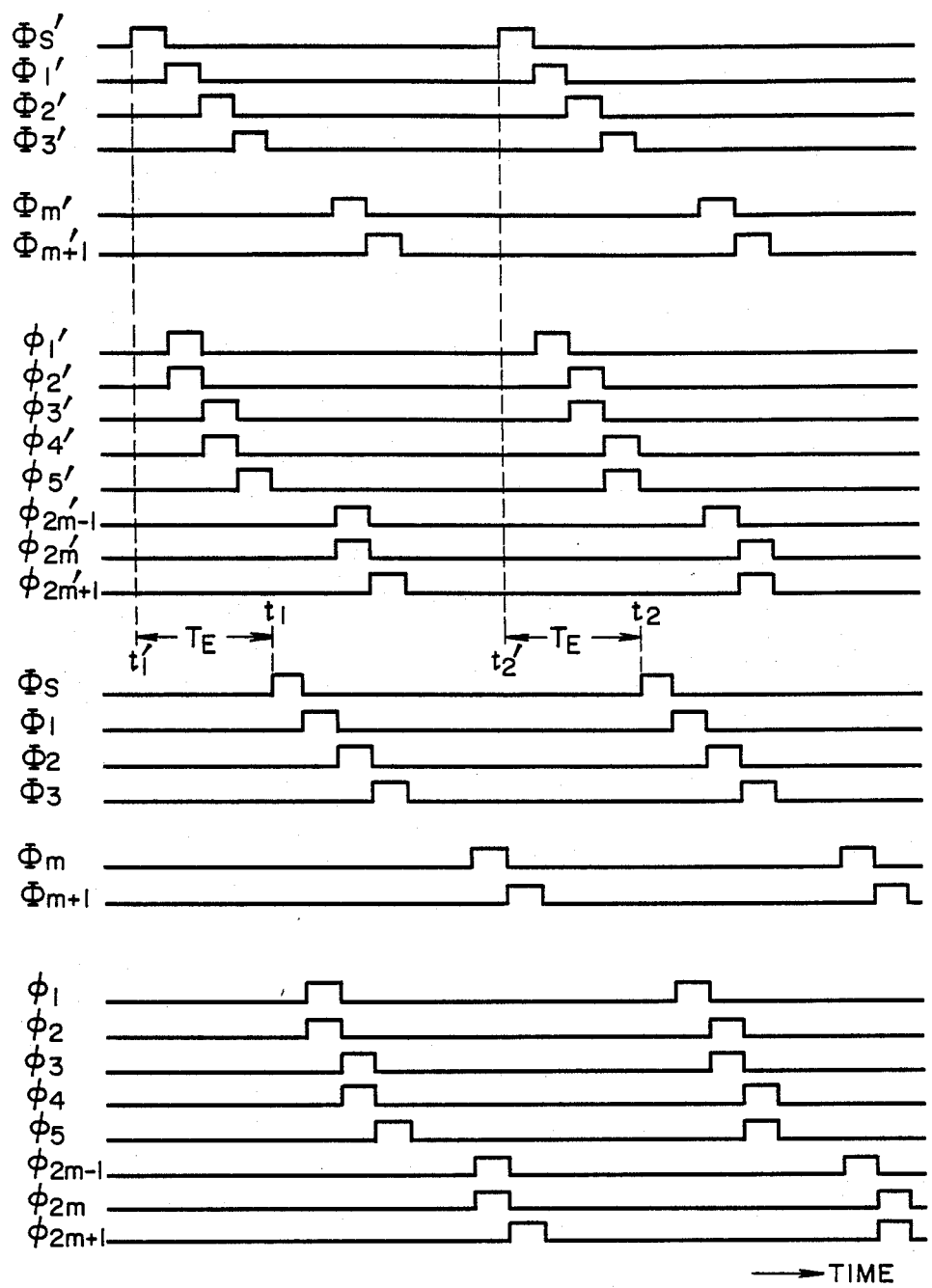
FIG. 22 is a timing chart useful for explaining the operation of the circuit of FIG. 21.

The shift register 26' (the dash "'" means the one for resetting purposes) is responsive to a start pulse $\phi'_S$ to generate a pulse train $\phi'_1, \phi'_2, \phi'_3 \ldots$ which are different in phase from one another. In FIG. 22, when the switches 25' are moved to the solid line positions at a time $t'_1$, resetting vertical selection pulses $\phi'_1, \phi'_2, \phi'_3, \ldots$ are generated as shown in FIG. 22. Then, in response to a start pulse $\phi_S$ delayed by a time $T_E$ from the start pulse $\phi'_S$, a pulse train $\phi_1, \phi_2, \phi_3 \ldots$ are generated. At this time, if the switches 25 are moved to the solid-line position at a time $t_1$, reading vertical selection pulses $\phi_1$, $\phi_2, \phi_3 \ldots$ are generated as shown in FIG. 2.

Also, by moving the switches 25' and 25 to the dotted-line positions at times $t'_2$ and $t_2$, respectively, the interlaced scanning can be effected as shown in FIG. 22. Where there is no need to effect the interlaced scanning, it is only necessary to move both of the switches 25' and 25 to the solid-line positions or the dotted line positions.

Figure 23:
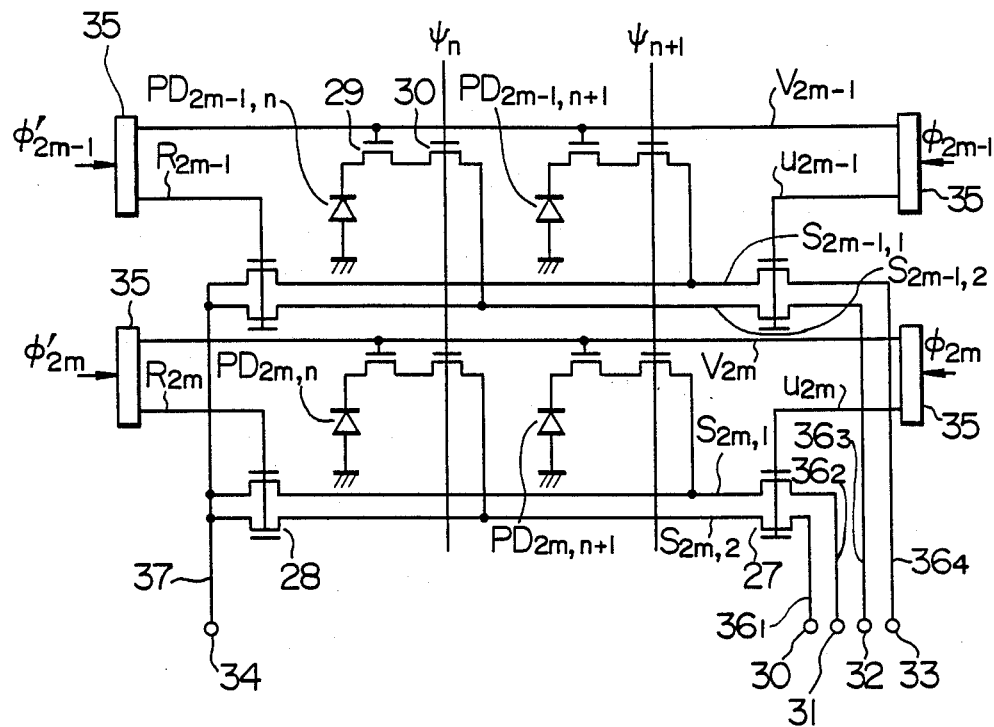
FIGS. 23 and 24 are detailed circuit diagrams of the photodiode section in the circuit of FIG. 19.

Referring now to FIG. 23, there is illustrated a detailed construction of the photodiode section 21. The photodiode section 21 includes row selection MOS switches 27, 28 and 29, column selection MOS switches 30, read terminals 30 to 33, a reset terminal 34, buffers 35, reading vertical signal lines 36, and a reset vertical signal line 37. Also, symbol PD designates photodiodes, and their subscripts indicate their row and column numbers. Symbol S designates horizontal signal lines. Subscripts i and j of $S_{i, j}$ indicate the jth signal line for the ith row. Symbol V designates vertical gate lines, symbol u reading vertical gate lines, symbol R resetting vertical gate lines, and subscripts row numbers.

The reading selection pulses $\phi$ and the resetting selection pulses $\phi'$ are each formed into two groups by the buffers 35 and are supplied to the vertical gate lines V, the reading vertical gate lines u and the resetting vertical gate lines R. Thus, during the resetting the charges in the photodiodes are read out to the reset terminal 34, and during the signal reading the charges in the photodiodes PD are read to the read terminals 30 to 33.

In FIG. 23, a plurality of the resetting vertical signal lines 37 may be provided as the reading vertical signal lines 36.

In addition, the reading vertical signal lines 36 have a degree of freedom such that the required number of the signal lines 36 is 3 if the number of the different color filters formed on the photodiodes is 3 (the four different color filters are used in the present embodiment), and only the single signal line 36 is required if no color filter is used.

Figure 24:
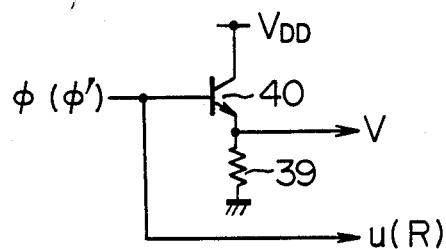

Referring now to FIG. 24, there is illustrated an exemplary construction of the buffer 35. In the Figure, the buffer 35 includes a resistor 39, an NPN transistor 40 and a power supply $V_{DD}$. The reading selection pulse $\phi$ or the resetting selection pulse $\phi'$ is directly supplied to the read vertical gate line u or the reset vertical gate line R and also supplied to the vertical gate line V through the transistor 29 forming a buffer. The reason is that if the reading selection pulse $\phi$ and the resetting selection pulse $\phi'$ are supplied directly, an excessively large current flows when for example the selection pulse $\phi$ goes to the high level and the selection pulse $\phi'$ goes to the low level. This exemplary construction has the effect of preventing such excessively large current flow.

In accordance with the invention, a MOS image pickup device is provided with a shutter function and the occurrence of rowwise variations of the exposure time and flicker is prevented, thereby providing the solid-state image pickup device with shutter function which ensures good picture quality.

We claim:

1. An image pickup device for a television camera comprising:
    an image sensor including a plurality of photodiodes arranged in a matrix form of M rows and N column to produce and store charges corresponding to a quantity of incident light from an object and a plurality of MOS switches each connected to one of said photodiodes of said image sensor;
    signal read means including a horizontal scanning circuit connected through a plurality of vertical signal lines to selected ones of said MOS switches to supply horizontal read pulses thereto, and a vertical scanning circuit connected through a plurality of horizontal signal lines provided one per row to another selected ones of said MOS switches to supply first vertical read pulses thereto, said first vertical read pulses being supplied simultaneously to selected two of said horizontal signal lines connected to vertically adjoining two rows of said photodiodes;

said image pickup device selectively operating said MOS switches by said horizontal read pulses and said first vertical read pulses to sequentially read the charges stored in said photodiodes at a rate of two rows thereof at a time, and reset scanning means connected through said horizontal signal lines to said another selected ones of said MOS switches to produce second vertical read pulses each preceding said first vertical read pulses produced from said vertical scanning circuit by a predetermined shutter time $T_S$ in seconds and supply said second vertical read pulses simultaneously to selected two of said vertical signal lines connected to vertically adjoining two rows of said photodiodes.

2. A device according to claim 1, wherein said predetermined shutter time $T_S$ is an even multiple of a horizontal scanning period of said horizontal scanning circuit.

3. A device according to claim 1, wherein said reset scanning circuit supplies said second vertical read pulses to the same two rows as said two rows selected by said vertical scanning circuit.

4. An image pickup device for a television camera comprising:

an image sensor including a plurality of photodiodes arranged in a matrix form having rows and columns to produce and store charges corresponding to a quantity of incident light from an object, said sensor further including first MOS switches coupled to said photodiodes and second MOS switches coupled to said first MOS switches, gates of said first MOS switches being coupled to horizontal signal lines, gates of said second MOS switches being couples to vertical signal lines, said second MOS switches being coupled with output signal lines;

a plurality of row output signal lines each provided to each of said rows and couples with said output signal lines;

a plurality of first vertical switch means each provided for each of said row output signal lines for coupling said row output signal lines with image sensor output signal lines in response to a switching signal;

horizontal scanning means coupled to said vertical signal lines for providing horizontal read pulses to said gates of second MOS switches;

vertical scanning means coupled to said horizontal signal lines for providing vertical read pulses to said gates of first MOS switches and also providing the switching signal to one of said plurality of first vertical switch means;

a plurality of second vertical switch means each provided for each of said row output signal lines for coupling said row output signal lines with reset signal lines in response to reset pulses; and reset scanning means producing said reset pulses which are provided to one of said plurality of second vertical switch means, each of said reset pulses preceding said vertical read pulse by a predetermined shutter time $T_S$.

5. An image pickup device according to claim 4, wherein said reset scanning means in also couples to said horizontal signal lines.

6. An image pickup device according to claim 5, wherein said reset scanning means includes means for selecting predetermined ones of said horizontal signal lines in synchronization with the generation of said reset pulses and in synchronization with the generation of horizontal read pulses by said horizontal scanning means to sequentially reset photodiodes in said image sensor prior to said photodiodes being read by the generation of said vertical read pulses at said time $T_S$ after said resetting.

* * * * *